(12) United States Patent
Zurek et al.

(10) Patent No.: US 11,942,087 B2
(45) Date of Patent: Mar. 26, 2024

(54) METHOD AND APPARATUS FOR USING IMAGE DATA TO AID VOICE RECOGNITION

(71) Applicant: Google Technology Holdings LLC, Mountain View, CA (US)

(72) Inventors: Robert A. Zurek, Antioch, IL (US); Adrian M. Schuster, West Olive, MI (US); Fu-Lin Shau, Lake Zurich, IL (US); Jincheng Wu, Naperville, IL (US)

(73) Assignee: Google Technology Holdings LLC, Mountain View, CA (US)

(*) Notice: Subject to any disclaimer, the term of this patent is extended or adjusted under 35 U.S.C. 154(b) by 169 days.

(21) Appl. No.: 17/147,991

(22) Filed: Jan. 13, 2021

(65) Prior Publication Data

US 2021/0134293 A1     May 6, 2021

Related U.S. Application Data

(63) Continuation of application No. 16/416,427, filed on May 20, 2019, now Pat. No. 10,923,124, which is a
(Continued)

(51) Int. Cl.
*G10L 15/22* (2006.01)
*B60N 2/00* (2006.01)
(Continued)

(52) U.S. Cl.
CPC .............. *G10L 15/22* (2013.01); *G06F 3/013* (2013.01); *G06V 20/59* (2022.01); *G06V 40/166* (2022.01);
(Continued)

(58) Field of Classification Search
USPC ..................................................... 704/1–504
See application file for complete search history.

(56) References Cited

U.S. PATENT DOCUMENTS 4,951,079 A    8/1990   Hoshino et al.
5,983,186 A    11/1999   Miyazawa et al.
(Continued)

FOREIGN PATENT DOCUMENTS

EP         1443498 A1    8/2004
EP         1884421 B1    10/2008
(Continued)

OTHER PUBLICATIONS

Sergei Preobrazhensky, Optimizing Acoustic Array Beamforming to Aid a Speech Recognition System, https://kb.osu.edu/dspace/bitstream/handle/1811/52868/ECE_683H_HONORS_THESIS.pdf?sequence=1, May 2012, all pages.
(Continued)

*Primary Examiner* — Marcus T Riley
(74) *Attorney, Agent, or Firm* — Honigman LLP; Brett A. Krueger; Grant Griffith

(57) ABSTRACT

A device performs a method for using image data to aid voice recognition. The method includes the device capturing image data of a vicinity of the device and adjusting, based on the image data, a set of parameters for voice recognition performed by the device. The set of parameters for the device performing voice recognition include, but are not limited to: a trigger threshold of a trigger for voice recognition; a set of beamforming parameters; a database for voice recognition; and/or an algorithm for voice recognition. The algorithm may include using noise suppression or using acoustic beamforming.

20 Claims, 9 Drawing Sheets

Related U.S. Application Data continuation of application No. 15/464,704, filed on Mar. 21, 2017, now Pat. No. 10,311,868, which is a continuation of application No. 14/164,354, filed on Jan. 27, 2014, now Pat. No. 9,747,900.

(60) Provisional application No. 61/827,048, filed on May 24, 2013.

(51) Int. Cl.

| | | |
|---|---|---|
| *G06F 3/01* | (2006.01) | |
| *G06V 20/59* | (2022.01) | |
| *G06V 40/16* | (2022.01) | |
| *G06V 40/18* | (2022.01) | |
| *G06V 40/19* | (2022.01) | |
| *G06V 40/20* | (2022.01) | |
| *G10L 15/20* | (2006.01) | |
| *G10L 15/24* | (2013.01) | |
| *G10L 15/25* | (2013.01) | |
| *G10L 15/26* | (2006.01) | |
| *G10L 21/0208* | (2013.01) | |
| *G10L 21/0216* | (2013.01) | |
| *G10L 25/78* | (2013.01) | |

(52) U.S. Cl.
CPC .............. *G06V 40/19* (2022.01); *G06V 40/20* (2022.01); *G10L 15/20* (2013.01); *G10L 15/25* (2013.01); *G10L 15/26* (2013.01); *G10L 21/0208* (2013.01); *B60N 2/002* (2013.01); *G06V 40/18* (2022.01); *G10L 2015/223* (2013.01); *G10L 2015/227* (2013.01); *G10L 15/24* (2013.01); *G10L 2021/02166* (2013.01); *G10L 25/78* (2013.01); *H04R 2430/20* (2013.01); *H04R 2460/07* (2013.01); *H04R 2499/11* (2013.01)

(56) References Cited

U.S. PATENT DOCUMENTS

| | | | |
|---|---|---|---|
| 6,021,278 A | 2/2000 | Bernardi et al. | |
| 6,101,338 A | 8/2000 | Bernardi et al. | |
| 7,043,429 B2 | 5/2006 | Chang et al. | |
| 7,778,632 B2 | 8/2010 | Kurlander et al. | |
| 7,962,331 B2 | 6/2011 | Miller et al. | |
| 8,073,590 B1 | 12/2011 | Zilka | |
| 8,078,397 B1 | 12/2011 | Zilka | |
| 8,131,458 B1 | 3/2012 | Zilka | |
| 8,249,309 B2 | 8/2012 | Kurzweil et al. | |
| 8,265,862 B1 | 9/2012 | Zilka | |
| 8,285,791 B2 | 10/2012 | Ratcliff | |
| 8,589,160 B2 | 11/2013 | Weeks et al. | |
| 8,612,211 B1 | 12/2013 | Shires et al. | |
| 8,660,847 B2* | 2/2014 | Soemo ................... G06F 3/167 | |
| | | | 704/251 |
| 8,666,750 B2* | 3/2014 | Buck ...................... G10L 15/28 | |
| | | | 704/270.1 |
| 8,700,392 B1 | 4/2014 | Hart et al. | |
| 9,094,576 B1 | 7/2015 | Karakotsios | |
| 9,420,227 B1 | 8/2016 | Shires et al. | |
| 9,479,736 B1 | 10/2016 | Karakotsios | |
| 9,747,900 B2 | 8/2017 | Zurek et al. | |
| 10,311,868 B2 | 6/2019 | Zurek et al. | |
| 10,482,904 B1* | 11/2019 | Hardie ................... G10L 15/22 | |
| 11,133,027 B1* | 9/2021 | Hardie ................... G10L 15/20 | |
| 11,148,296 B2* | 10/2021 | Breazeal ................ G10L 15/22 | |
| 11,195,531 B1* | 12/2021 | Adams ................ H04M 3/5166 | |
| 2002/0105575 A1 | 8/2002 | Hinde et al. | |
| 2003/0018475 A1 | 1/2003 | Basu et al. | |
| 2004/0267521 A1 | 12/2004 | Cutler et al. | |
| 2004/0267536 A1 | 12/2004 | Hershey et al. | |
| 2005/0086051 A1 | 4/2005 | Brulle-Drews | |
| 2005/0102133 A1 | 5/2005 | Rees | |
| 2005/0128311 A1 | 6/2005 | Rees et al. | |
| 2005/0272415 A1* | 12/2005 | McConnell ............... G06F 3/16 | |
| | | | 455/66.1 |
| 2006/0100876 A1 | 5/2006 | Nishizaki et al. | |
| 2008/0037837 A1 | 2/2008 | Noguchi et al. | |
| 2008/0059147 A1 | 3/2008 | Afify et al. | |
| 2008/0262849 A1* | 10/2008 | Buck ...................... G10L 15/28 | |
| | | | 704/E11.001 |
| 2008/0289002 A1 | 11/2008 | Portele et al. | |
| 2009/0018831 A1 | 1/2009 | Morita | |
| 2009/0043576 A1 | 2/2009 | Miller et al. | |
| 2010/0103242 A1 | 4/2010 | Linaker | |
| 2010/0241432 A1 | 9/2010 | Michaelis | |
| 2010/0328316 A1 | 12/2010 | Stroila et al. | |
| 2011/0043652 A1 | 2/2011 | King et al. | |
| 2011/0092249 A1 | 4/2011 | Evanitsky | |
| 2011/0150270 A1 | 6/2011 | Carpenter et al. | |
| 2011/0184735 A1 | 7/2011 | Flaks et al. | |
| 2011/0224979 A1 | 9/2011 | Raux | |
| 2011/0257971 A1 | 10/2011 | Morrison | |
| 2012/0014567 A1 | 1/2012 | Allegra et al. | |
| 2012/0089397 A1 | 4/2012 | Arai et al. | |
| 2012/0143605 A1 | 6/2012 | Thorsen et al. | |
| 2012/0173224 A1 | 7/2012 | Anisimovich et al. | |
| 2012/0215539 A1 | 8/2012 | Juneja | |
| 2012/0236025 A1 | 9/2012 | Jacobsen et al. | |
| 2012/0327177 A1 | 12/2012 | Kee et al. | |
| 2013/0046537 A1 | 2/2013 | Weeks et al. | |
| 2013/0053007 A1 | 2/2013 | Cosman et al. | |
| 2013/0060571 A1* | 3/2013 | Soemo ..................... G06F 3/011 | |
| | | | 704/E15.001 |
| 2013/0073583 A1 | 3/2013 | Licata et al. | |
| 2013/0090931 A1 | 4/2013 | Ghovanloo et al. | |
| 2013/0096918 A1 | 4/2013 | Harada | |
| 2013/0124207 A1* | 5/2013 | Sarin ...................... G06F 3/167 | |
| | | | 704/E11.001 |
| 2013/0173701 A1 | 7/2013 | Goyal et al. | |
| 2013/0339024 A1 | 12/2013 | Kojima | |
| 2014/0350924 A1 | 11/2014 | Zurek et al. | |
| 2015/0206535 A1 | 7/2015 | Iwai | |
| 2016/0231818 A1 | 8/2016 | Zhang et al. | |
| 2017/0193996 A1 | 7/2017 | Zurek et al. | |
| 2019/0341044 A1 | 11/2019 | Zurek et al. | |
| 2021/0134293 A1* | 5/2021 | Zurek .................... G06V 40/19 | |

FOREIGN PATENT DOCUMENTS

| | | |
|---|---|---|
| EP | 2065871 A1 | 6/2009 |
| WO | 2002015560 A2 | 2/2002 |

OTHER PUBLICATIONS

Bub et al., "Knowing who to listen to in speech recognition: visually guided beamforming," 1995 International Conference on Acoustics, Speech, and Signal Processing—May 9-12, 1995—Detroit, MI, USA, IEEE—New York, NY, USA, vol. 1, May 9, 1995, pp. 848-851, 4 pages.

Invitation to Pay Additional Fees and, Where Applicable, Protest Fee in International Application No. PCT/US2014/036831, dated Jul. 28, 2014, 8 pages.

Ho, T., et al., "A word shape analysis approach to lexicon based word recognition", Pattern Recognition Letters 13 (1992) 821-826, Nov. 1992, 6 pages.

International Search Report and Written Opinion in International Application No. PCT/US2014/036831, dated Nov. 3, 2014, 16 pages.

International Preliminary Report on Patentability in International Application No. PCT/US2014/036831, dated Dec. 3, 2015, 11 pages.

* cited by examiner

```
         ┌─────────────────────────┐ ╱─302
         │   CAPTURE IMAGE DATA    │
         └─────────────┬───────────┘
                       ▼
         ┌─────────────────────────┐ ╱─304
         │ ADJUST, BASED ON THE    │
         │ IMAGE DATA, A SET OF    │
         │ PARAMETERS FOR          │
         │ PERFORMING VOICE        │
         │ RECOGNITION             │
         └─────────────────────────┘
```

*FIG. 3*

| CONDITION | ONLY ONE PERSON DETECTED | SEVERAL PEOPLE DETECTED | CROWD DETECTED |
|---|---|---|---|
| RELATIVE TRIGGER THRESHOLD | 2 | 5 | 9 |

*FIG. 4*

| CONDITION | LIMITED-PERSON ENVIRONMENT DETECTED | MULTI-PERSON ENVIRONMENT DETECTED | CROWDED ENVIRONMENT DETECTED |
|---|---|---|---|
| RELATIVE TRIGGER THRESHOLD | 2 | 5 | 9 |

METHOD AND APPARATUS FOR USING IMAGE DATA TO AID VOICE RECOGNITION

RELATED APPLICATIONS

This patent application is a continuation of, and claims priority under 35 U.S.C. § 120 from, U.S. patent application Ser. No. 16/416,427, filed on May 20, 2019, which is a continuation of U.S. patent application Ser. No. 15/464,704, filed on Mar. 21, 2017, which is a continuation of U.S. patent application Ser. No. 14/164,354, filed on Jan. 27, 2014, which claims priority under 35 U.S.C. § 119(e) from, U.S. Provisional Application No. 61/827,048, filed on May 24, 2013. The disclosures of these prior applications are considered part of the disclosure of this application and are hereby incorporated by reference in their entireties.

FIELD OF THE DISCLOSURE

The present disclosure relates generally to voice recognition and more particularly to using image data to aid voice recognition.

BACKGROUND

Mobile electronic devices, such as smartphones and tablet computers, continue to evolve through increasing levels of performance and functionality as manufacturers design products that offer consumers greater convenience and productivity. One area where performance gains have been realized is in voice recognition. Voice recognition frees a user from the restriction of a device's manual interface while also allowing multiple users to access the device more efficiently. Currently, however, new innovation is required to support a next-generation of voice-recognition devices that are better able to adapt to the complications associated with multiple-user environments.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a flowchart of a method for adjusting a trigger threshold for voice recognition in accordance with some embodiments of the present teachings.

FIG. 4 is a table of relative trigger thresholds for voice recognition in accordance with some embodiments of the present teachings.

FIG. 5 is a table of relative trigger thresholds for voice recognition in accordance with some embodiments of the present teachings.

Figure 1:
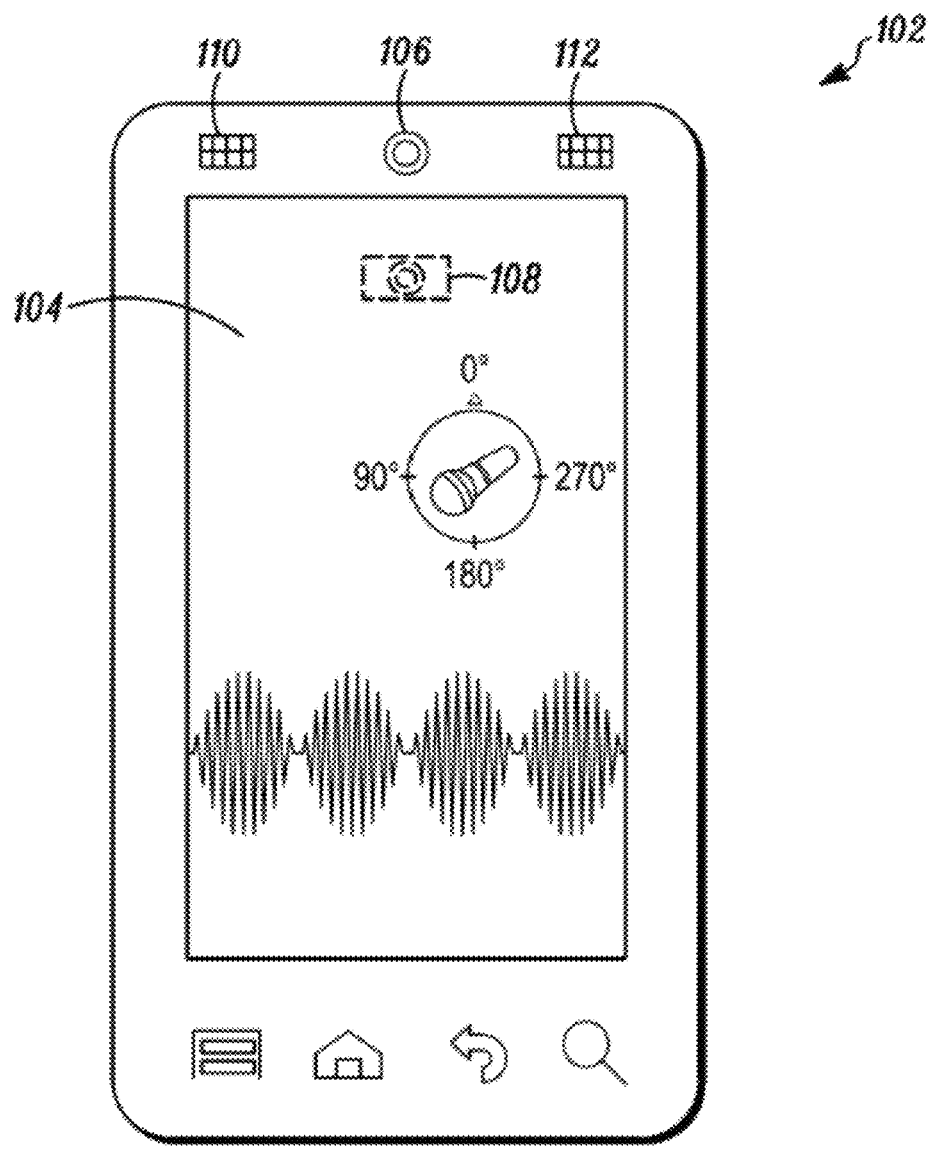
FIG. 1 is a schematic diagram of a device in accordance with some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides methods and apparatus for using image data to aid voice recognition. The embodiments disclosed allow a voice-recognition capable device to use image data to adapt its voice recognition functionality to improve the voice recognition experience for both single and multiple users. In accordance with the teachings herein, a method performed by a device for using image data to aid in voice recognition includes capturing image data of a vicinity of the device and adjusting, based on the image data, a set of parameters for voice recognition performed by the device.

Further in accordance with the teachings herein is a method performed by a device for using image data to aid in voice recognition that includes: capturing image data; receiving first voice data spoken into the device from a first individual and second voice data spoken into the device from a second individual; and associating the first voice data to the first individual and the second voice data to the second individual using the image data. The method further includes: translating, using a voice recognition process, the first voice data into a first written passage within a document and the second voice data into a second written passage within the document; associating the first written passage with the first individual using a first annotation within the document that identifies the first individual; and associating the second written passage with the second individual using a second annotation within the document that identifies the second individual.

Also in accordance with the teachings herein is a device configured for using image data to aid in voice recognition.

The device includes a set of cameras configured for capturing image data, and at least one acoustic transducer configured for receiving voice data. The device further includes a processor configured for: detecting a set of individuals within the image data; determining from the image data whether at least one person within the set of individuals is gazing at the device; and adapting processing by the voice recognition module of the voice data based on whether the at least one individual is gazing at the device.

Referring now to the drawings, and in particular FIG. 1, an electronic device (also referred to herein simply as a "device") implementing embodiments in accordance with the present teachings is shown and indicated generally at 102. Specifically, device 102 represents a smartphone that includes: a user interface 104, capable of accepting tactile input and displaying visual output; forward-facing and rearward-facing cameras, at 106 and 108, respectively, capable of capturing images of the device's surroundings; and right and left microphones, at 110 and 112, respectively, capable of receiving an audio signal at each of two locations. While the microphones 110, 112 are shown in a left-right orientation, in alternate embodiments they can be in a front-back orientation, a top-bottom orientation, or any combination thereof. While a smartphone is shown at 102, no such restriction is intended or implied as to the type of device to which these teachings may be applied. Other suitable devices include, but are not limited to: personal digital assistants (PDAs); audio- and video-file players (e.g., MP3 players); personal computing devices, such as phablets; tablets; and wearable electronic devices, such as devices worn with a wristband. For purposes of these teachings, a device can be any apparatus that has access to a voice-recognition engine, is capable of capturing image data, and can receive an acoustic voice signal.

Figure 2:
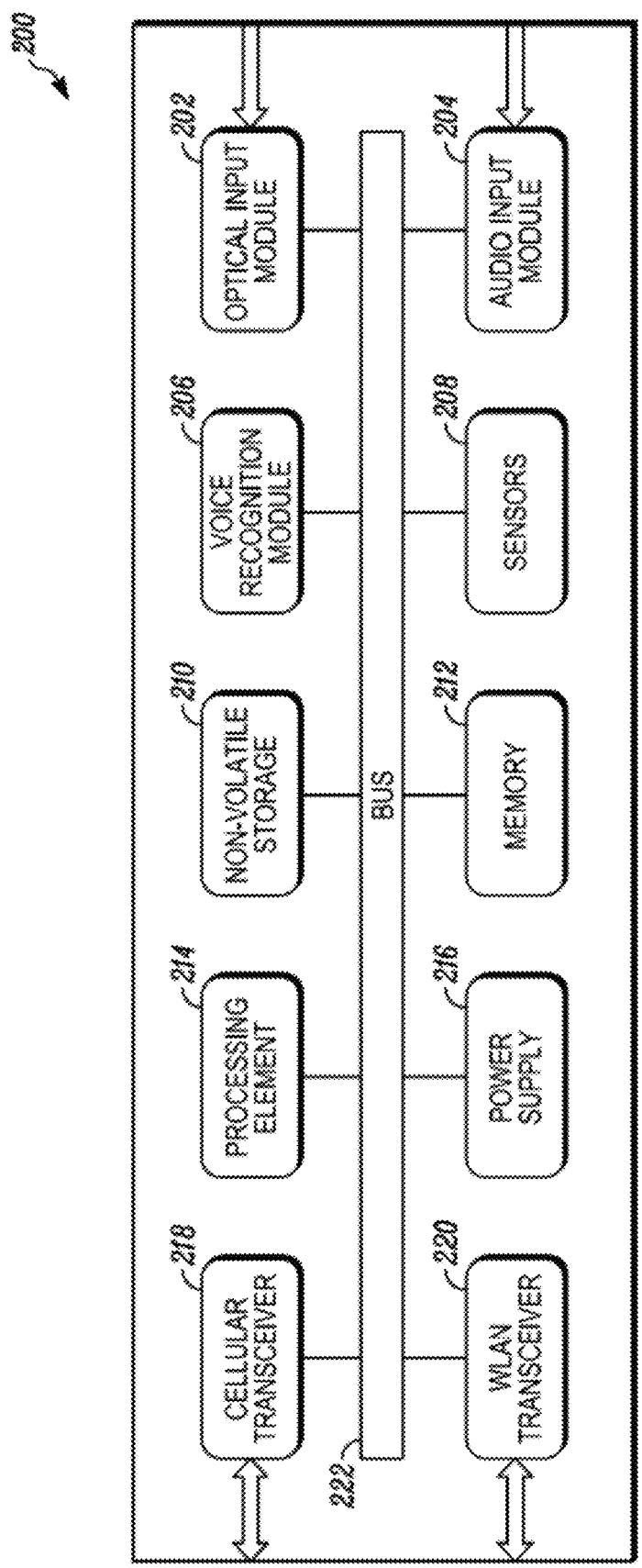
FIG. 2 is a block diagram of a device configured for implementing embodiments in accordance with the present teachings.

Referring to FIG. 2, a block diagram for a device in accordance with embodiments of the present teachings is shown and indicated generally at 200. For one embodiment, the block diagram 200 represents the device 102. Specifically, the schematic diagram 200 shows: an optical input module 202, an audio input module 204, a voice recognition module 206, sensors 208, non-volatile storage 210, memory 212, a processing element 214, a power supply 216, a cellular transceiver 218, and a wireless-local-area-network (WLAN) transceiver 220, all operationally interconnected by a bus 222.

A limited number of device elements 202-222 are shown at 200 for ease of illustration, but other embodiments may include a lesser or greater number of such elements in a device, such as device 102. Moreover, other elements needed for a commercial embodiment of a device that incorporates the elements shown at 200 are omitted from FIG. 2 for clarity in describing the enclosed embodiments.

We now turn to a brief description of the elements within the schematic diagram 200. In general, the optical input module 202, the audio input module 204, the voice recognition module 206, and the processing element 214 are configured with functionality in accordance with embodiments of the present disclosure as described in detail below with respect to the remaining figures. "Adapted," "operative," "capable" or "configured," as used herein, means that the indicated elements are implemented using one or more hardware devices such as one or more operatively coupled processing cores, memory devices, and interfaces, which may or may not be programmed with software and/or firmware as the means for the indicated elements to implement their desired functionality. Such functionality is supported by the other hardware shown in FIG. 2, including the device elements 208, 210, 212, 216, 218, 220, and 222.

Continuing with the brief description of the device elements shown at 200, as included within the device 102, the processing element 214 (also referred to herein as a processor) includes arithmetic logic and registers necessary to perform the digital processing required by the device 102 to process image data and aid voice recognition in a manner consistent with the embodiments described herein. For one embodiment, the processing element 214 represents a primary microprocessor of the device 102. For example, the processing element 214 can represent an application processor of the smartphone 102. In another embodiment, the processing element 214 is an ancillary processor, separate from a central processing unit (CPU, not shown), dedicated to providing the processing capability, in whole or in part, needed for the device elements 200 to perform their intended functionality.

The optical input module 202 includes elements needed to capture images of a vicinity of the device 102 and to convert the images to image data that can be processed by the processing element 214. Image data represents the informational content of one of more images, independent of its encoded format. The images may represent static images, such as pictures, or kinetic images, such as videos. Image data can also come from a series of images captured over an interval of time, for instance as with video. The time interval can be short or long relative to a voice recognition process aided by the image data. In a first example, a short time interval over which image data is captured to aid a voice recognition process occurs at the beginning of the voice recognition process. In a second example, the time interval over which image data is captured to aid a voice recognition process spans the voice recognition process, either in part or in its entirety.

For device 102, images are captured by the cameras 106 and 108. In one embodiment, converting images to image data involves converting the images to a digital format that can be stored electronically and transmitted to the processing element 214 for processing. Example codec technologies used for image conversion include, but are not limited to, the Joint Photographic Experts Group (JPEG) standard for pictures and the Moving Picture Experts Group (MPEG) standard for videos. Limitations, such as the focal length and the resolution of a lens used by a camera, determine the effective range for which useful image data can be obtained. Generally, devices, such as the device depicted at 102, are designed to capture useful image data at those distances from which acoustic signals originate that affect voice recognition performed by the device. The area within these distances is defined to be the "vicinity" of the device.

The audio input module 204 includes elements needed to receive acoustic signals that include speech, represented by the voice of a single or multiple individuals, and to convert the speech into voice data that can be processed by the voice recognition module 206 and/or the processing element 214. For a particular embodiment, the audio input module 204 includes one or more acoustic transducers, which for device 102 are represented by the microphones 110 and 112. The acoustic transducers covert the acoustic signals they receive into electronic signals, which are encoded for storage and processing using codecs such as the recursively named codec LAME Ain't an MP3 Encoder (LAME).

The voice recognition module 206 includes the elements needed to process voice data by recognizing words. Voice recognition, as used herein, refers to the ability of hardware and/or software to interpret speech. In one embodiment, processing voice data includes converting speech to text. This type of processing is used, for example, when one is dictating an e-mail. In another embodiment, processing voice data includes identifying commands from speech. This type of processing is used, for example, when one wishes to give a verbal instruction or command, for instance, to the device 102. For different embodiments, the voice recognition module 206 can include a single or multiple voice recognition engines of varying types, each of which is best suited for a particular task or set of conditions. For instance, certain types of voice recognition engines might work best for speech-to-text conversion, and of those voice recognition engines, different ones might be optimal depending on the specific characteristics of a voice.

The block element 208 represents one or more sensors that in an embodiment determine conditions that affect how audio and image data is collected and/or processed. In one embodiment, the sensors 208 include motion sensors, such as velocity sensors and/or a global positioning system (GPS) receiver, that determine a speed for the device 102. The speed of the device 102, in turn, determines a decibel level and spectral characteristics of wind noise that is integrated with one or more voices in the acoustic signal. By using the correct filter settings, the wind noise can be mitigated to improve the signal-to-noise ratio of the acoustic signal. In another embodiment, the sensors 208 include an accelerometer that detects shocks imparted to the device 102 that cause intermittent noise in the acoustic signal.

The non-volatile storage 210 provides the device 102 with long-term storage for applications, data tables, and other media used by the device 102 in performing the methods described herein. For particular embodiments, the device 102 uses magnetic (e.g., hard drive) and/or solid state (e.g., flash memory) storage devices. The memory 212 represents short-term storage, which is purged when the power supply 216 is switched off and the device 102 powers down. In one embodiment, the memory 212 represents random access memory (RAM) having faster read and write times than the non-volatile storage 210.

The cellular transceiver 218 allows the device 102 to upload and download data to and from a cellular network. The cellular network can use any wireless technology that enables broadband and Internet Protocol (IP) communications including, but not limited to, $3^{rd}$ Generation (3G) wireless technologies such as CDMA2000 and Universal Mobile Telecommunications System (UMTS) networks or 4th Generation (4G) or pre-4G wireless networks such as LTE and WiMAX. Additionally, the WLAN transceiver 220 allows the device 102 direct access to the Internet using standards such as Wi-Fi.

We turn now to a detailed description of the functionality of the device 102 and the device elements shown in FIGS. 1 and 2 at 102 and 200, respectively, in accordance with the teachings herein and by reference to the remaining figures. FIG. 3 is a logical flow diagram illustrating a method 300 performed by a device, taken to be device 102 for purposes of this description, for using image data to aid in voice recognition in accordance with some embodiments of the present teachings. For one embodiment, the device 102 uses both the forward-facing 106 and rearward-facing 108 cameras with a wide-angle setting to capture image data for the widest possible range of angles, and thereby covering almost every direction. In another embodiment, the device 102 uses a telescopic setting on one or both cameras 106, 108 to target specific areas and for greater resolution at distance.

The method 300 includes the device 102 capturing 302 image data of a vicinity of the device 102 and adjusting 304, based on the image data, a set of parameters for performing voice recognition. As used herein, the term "set" may include one or more elements. A "parameter," as used herein, is a characteristic, feature, or measurable factor that relates to or defines the performance of voice recognition by a device. In different embodiments, a set of parameters for the device 102 performing voice recognition includes, but is not limited to: a trigger threshold of a trigger for voice recognition; a database for voice recognition; and/or an algorithm for voice recognition, wherein the algorithm includes, in some embodiments, using noise suppression or using acoustic beamforming.

For one embodiment, adjusting 304 the set of parameters based on the image data includes adjusting a trigger threshold of a trigger for voice recognition based on the image data. The term "trigger," as used herein, refers to an event or condition that causes or precipitates another event, whereas the term "trigger threshold" refers to a sensitivity of the trigger to that event or condition. Adjusting a trigger threshold, as used herein, refers to establishing a setting for the trigger threshold or changing a setting for the trigger threshold. In an embodiment relating to command recognition, the trigger condition is a match between phonemes received in voice data to phonemes stored as reference data. When a match occurs, the device 102 performs the command represented by the phonemes. What constitutes a match is determined by the trigger threshold. For the same embodiment, the trigger sensitivity is the minimum degree to which the phonemes must match before the command is performed. For example, in a noisy environment, the trigger threshold is set high, requiring a 95% phoneme match, to prevent false positives.

The device 102 determines from the image data that it is within a particular type of environment and sets the trigger threshold based on the type of environment. In one embodiment, the type of environment is an interior of a motor vehicle and the trigger threshold is set to make the trigger less discriminating (using lower tolerances to "open up" the trigger so that it is more easily "tripped") when the device 102 is within the interior of a motor vehicle relative to when the device 102 is within another type of environment. By comparison to other environments, the interior of a motor vehicle is a relatively personal environment for which there is a diminished probability that sound originating from a source other than the user of the device 102 will trigger an unintended command.

For particular embodiments, the device 102 determines it is in a motor vehicle by comparing the image data it receives to images in a reference database. The reference database is stored either locally on the device 102, using the non-volatile storage 210 or memory 212, or stored remotely, and accessed using the cellular 218 or WLAN 220 transceiver. In one embodiment, the device 102 uses the identification of a steering wheel to determine it is in a motor vehicle. While in another embodiment, identifying a rear-view mirror centered at the top of a windshield is used to determine the device 102 is in a motor vehicle. In alternate embodiments, the determination is made from the identification of other features, either in isolation, or in combination with additional image and non-image data. The definition of a motor vehicle can be programmed into the device 102 to include automobiles, both light and heavy trucks, boats, combines, and other enclosed modes of transportation for which non-stationary sources of ambient noise are low and not likely to trigger voice recognition.

In a further embodiment, the device 102 detects a number of persons that are within the interior of the motor vehicle from the image data and makes the trigger less discriminating upon detecting that there is only one person within the motor vehicle relative to detecting that there are multiple people within the motor vehicle. Additional persons within the motor vehicle represent additional voices that are received by the device 102, any one of which may unintentionally trigger voice recognition. To mitigate this effect, the device 102 opens up the trigger by lowering the trigger threshold when only one person is detected in the motor vehicle and increases the trigger threshold when multiple people are detected in the motor vehicle.

In one embodiment, the device 102 uses a wide-angle setting on one or both of its cameras 106, 108 to receive image data from which a determination of how many people are present is made. In another embodiment, the device 102 is docked at a docking station, positioned near the center of a dashboard for the motor vehicle, facing rearward toward the vehicle's back end. From this position, the device 102 uses its forward-facing camera 106 to monitor the "anticipated" positions of passengers within the motor vehicle. Each seat has approximately the same distance and angle measure to the device 102 across different makes and models of motor vehicles. For example, relative to the rearward-facing device 102 docked at the center of the dashboard, the front passenger seat for most motor vehicles is located about one meter away at an angle of approximately thirty degrees.

For some embodiments, the type of environment is defined by the number of individuals in proximity to the device 102. The device 102 detects a set of individuals in its vicinity from the image data and sets the trigger threshold based on the set of individuals. In particular embodiments, the trigger threshold is set to make the trigger less discriminating when the detected set of individuals contains only a single person relative to when the set of individuals contains multiple persons. One such embodiment is represented by FIG. 4.

FIG. 4 shows a table at 400 of relative trigger thresholds, each indicated by a numerical value, for different numbers of people detected. For table 400 (and also for tables 500 and 1000), lower numbers indicate a lower threshold associated with a less discriminating trigger. When only one person is detected, the device 102 sets the trigger threshold to "2." With only one person in the vicinity of the device 102, the chance of another person triggering voice recognition (command recognition, for example) is less likely. For the depicted condition, the device 102 does not set the trigger threshold to "1" to address the possibility of receiving a false positive from ambient noise sources. For example, the user of device 102 may be alone in a car with the radio playing, or have the windows open.

The device 102 sets the trigger threshold to "5" or "9" when it detects several people or a crowd, respectively, in its vicinity. This further mitigates the possibility of receiving a false positive from ambient noise sources, which in these cases includes the voices of additional individuals. For one environment, a number of individuals that constitutes a crowd is programmed into the device 102. In another embodiment, the relative trigger threshold is calculated as a function of a number of detected individuals, which may result in more than the three conditional "levels" indicated in table 400. For example, setting the relative trigger threshold value equal to the number of persons detected provides an ever more discriminating trigger in the presence of additional individuals.

FIG. 5 shows a table at 500 depicting relative trigger thresholds for environments that are characterized by a number of people. Rather than setting the trigger threshold for voice recognition directly from a number of persons detected, the device 102 identifies a type of environment and sets the trigger threshold based on the number of persons the type of environment is usually associated with.

The inside of a motor vehicle is an example of a limited-person environment, which often has only a single person, namely a driver. By contrast, crowded environments include, but are not limited to: concerts, theaters, sporting events, amusement parks, church services, and urban centers. For an embodiment, the device 102 determines it is in a crowded environment by identifying rows of "stadium style" seating from captured image data. Without determining an exact number of individuals in the vicinity of the device 102, the device 102 sets the trigger threshold to "9" to reflect a crowded environment and minimize the occurrence of false positives resulting from voices in the crowd.

For one embodiment, multi-person environments are also identified and associated with a trigger threshold between that of the limited-person environment and the crowded environment. The device 102 may determine it is in a retail establishment, for example, such a grocery or department store, by identifying stocked shelving bordering long isles from captured image data. Alternatively (or additionally), the device 102 may match a portion of a captured image to a database image of a shopping cart to determine the device 102 is in a multi-person environment. The device 102 then sets its trigger threshold accordingly.

Under some circumstances, it is desirable to allow multiple users simultaneous access to the device 102, or at a minimum, determine that a user in proximity to the device 102 is an authorized user. Under such conditions, setting the trigger threshold and other implementations relating to voice recognition may be governed, at least in part, by different criteria. An "authorized person" or an "authorized user" of a device, as used herein, is defined to be a person to whom privileges are granted in connection with the device. These privileges represent a level of access to the device, which may be different for different users.

For an embodiment, the device 102 determines if a person is an authorized user, and if so, the level of access that person holds. From a set of individuals determined from image data to be in the vicinity of the device 102, the device 102 uses facial recognition to identify a particular individual as an authorized user by referencing stored profiles. Methods of facial recognition are known in the art and include comparing captured facial images against references images and/or compiled data. The references images and/or compiled data is stored either locally at the device 102 or on a remote server.

In another embodiment, the device 102 adjusts a set of parameters for voice recognition by selecting a particular algorithm or database for performing voice recognition based on image data the device 102 captures. From captured image data, for example, the device 102 determines it is in a specific environment, and based on the environment, the device 102 determines that a particular database, algorithm, and/or voice-recognition engine should be used for performing voice recognition. A specific algorithm, for instance, might be particularly suited for a certain type of environment based on a method of noise suppression the algorithm uses. If captured image data indicates a crowded environment, a first algorithm using a first type of noise suppression might be best suited for voice recognition. Alternatively, if captured image data indicates vehicular travel, a second algorithm using a second type of noise suppression might be best suited for voice recognition. As another example, the device 102 adjusts a set of parameters for voice recognition by selecting a voice-recognition database or voice-recognition engine based on a gender of a speaker identified from image data the device 102 captures.

Figure 6:
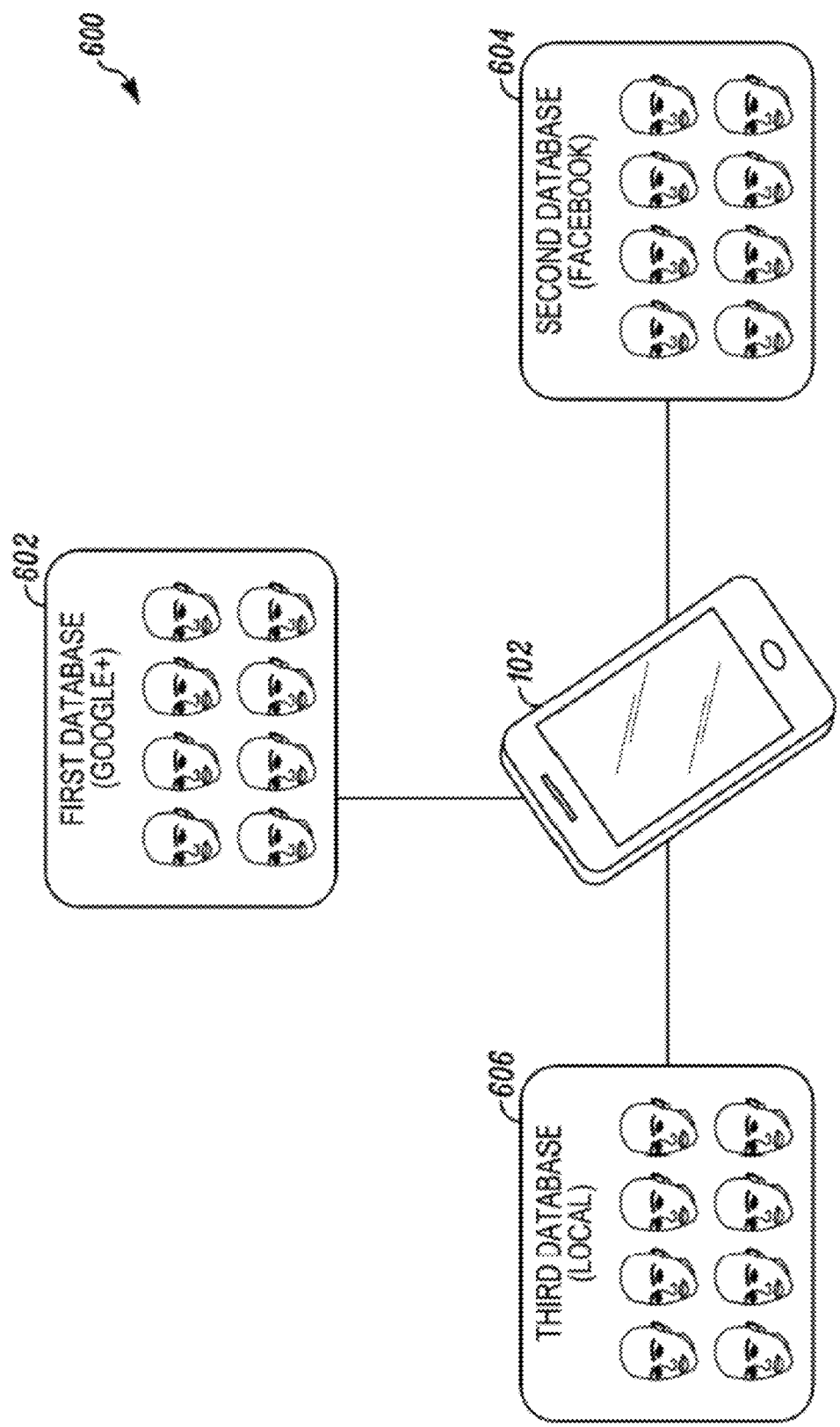
FIG. 6 is a schematic diagram illustrating group membership and device access in accordance with some embodiments of the present teachings.

FIG. 6 shows a schematic diagram at 600 indicating the device 102 and three databases to which it has access. For several embodiments, these databases hold information on authorized users and the privileges those users hold. The first database 602 shown is a Google+ database that stores the profiles of authorized users in a workgroup. This database 602 is stored on Google servers, created and updated by one or more account holders, and accessed using the cellular 218 or WLAN 220 transceiver.

The second database 604 is stored on Facebook servers and holds the profiles of people the owner of device 102 has personally granted access to. Additional profiles are held in a third database 606 that is stored locally, using the non-volatile storage 210. For each database, one or more groups are defined such that all members of a group share a common level of access to the device 102. People from a set of individuals detected in the vicinity of the device 102 are compared against the profiles in the databases 602-606 to determine if they are members of any authorized group.

For a particular embodiment, the processor 214 of the device 102 is configured to determine that a first person of the set of individuals is a member of a first group with a first set of access privileges to the device 102 and determine that a second person of the set of individuals is a member of a second group with a second set of access privileges to the device 102 that is different from the first set of access privileges, and to adapt processing by the voice recognition module 206 by accepting a voice command from the first person but not the second person. The device 102 accepts a voice command from the first person to read e-mails, for example, but not from the second person who does not have a sufficient level of authorization to access the e-mails.

In some instances, access by group members depends not only on assigned access privileges, but also on a current state of use for the device 102. Returning to the above embodiment, the voice command from the second person is rejected by the device 102 while it is being used for business purposes, for example, because the second person's access privileges are for personal use. The same command is accepted from the second person only at specific times or under specific circumstances. In an embodiment, circumstances that govern the acceptance of voice commands from authorized individuals are stored in the user profiles. In further embodiments, profile types are identified by the database in which they are stored. For example, profiles of users that are authorized to access the device 102 for work-related tasks are stored in the Google+ database 602 while the profiles of users with social access are stored in the Facebook database 604.

Figure 7:
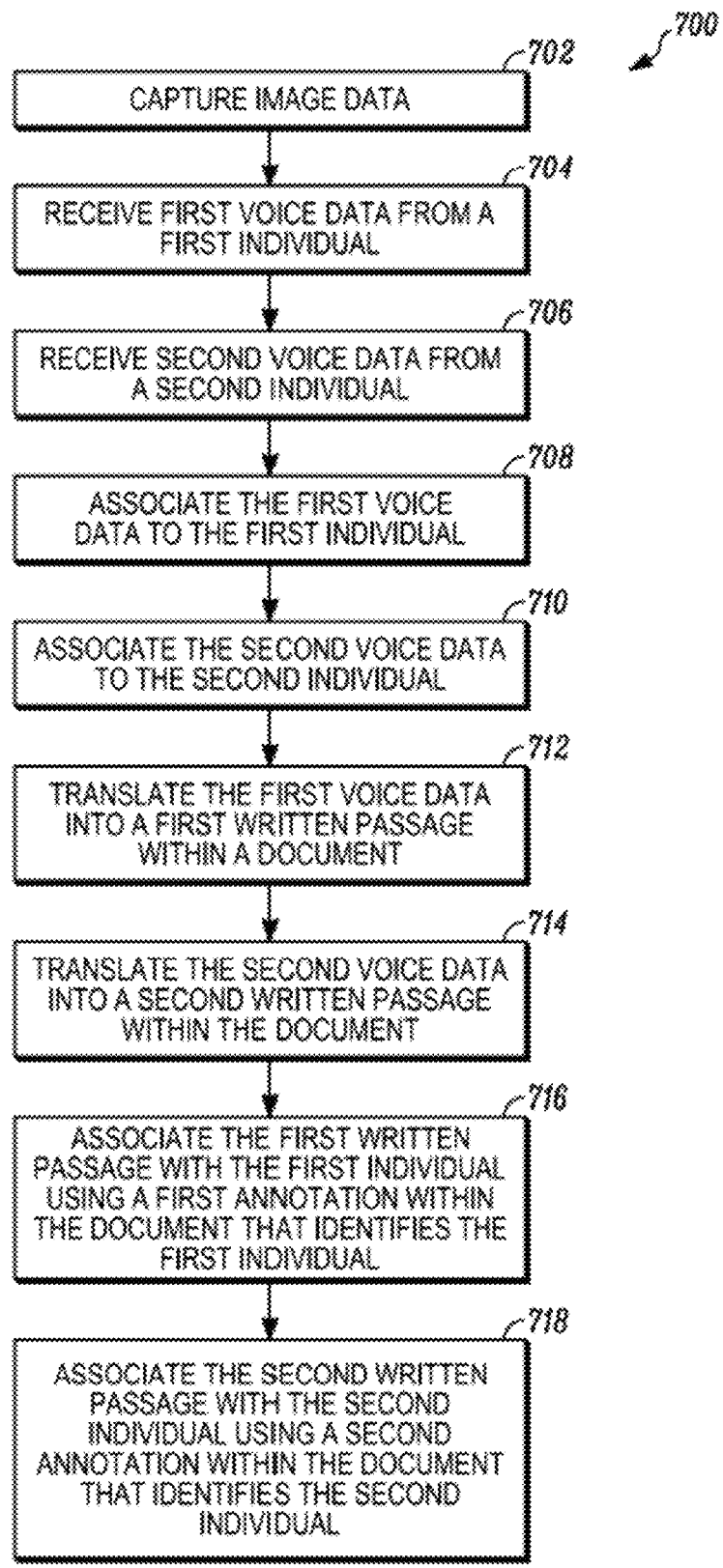
FIG. 7 is a flowchart of a method for annotated dictation in accordance with some embodiments of the present teachings.

A particular state of use involving multiple users concerns annotated dictation. FIG. 7 is a logical flow diagram that illustrates a method 700 performed by a device, such as device 102, for annotated dictation in accordance with some embodiments of the present teachings. The method 700 begins with the device 102 gathering data. Specifically, the device 102 captures 702 images of a first and second individual. The device also receives 704 a first acoustic signal, e.g., speech that is captured by one or both microphones 110, 112 of device 102, from the first individual that includes voice data for that individual. Likewise, the device 102 receives 706 a similar acoustic signal from the second individual, which includes voice data. Voice data, as used here, refers to the informational content of the voice included within the acoustic signal. If, for example, the acoustic signal is encoded as an MP3 file, the voice data represents the portions of that file that digitally encode the voice.

The device 102 associates 708 voice data from the first acoustic signal with the first individual. For a particular embodiment, the device 102 identifies the first individual using facial recognition in conjunction with one or more of the profile databases 602-606. The association between the voice data of the first acoustic signal (or first voice data) and the first individual can be made in a number of ways. In a first embodiment, the device 102 sets a direction from which the acoustic signal was received by utilizing beam-forming techniques. The device 102 matches this direction with a direction to the first individual as determined from the captured image data.

The orientation and width of the virtual microphone beamform is determined based on the position of the user in the captured image and the number of subjects identified in the image or images. As more subjects are identified, the beamform is made narrower. If only a single individual user is identified, the virtual microphone can be as simple as a unidirectional beamform, such as a cardioid oriented toward the user. In one embodiment, the unidirectional beamform can either be forward facing or rearward facing depending on which camera the user is captured with. The beam form is made forward facing if the user is captured with the forward-facing camera 106, and the beam form is made rearward facing if the user is captured with the rearward-facing camera 108.

In other embodiments, the device 102 adjusts a set of parameters for voice recognition based on captured image data for which the device 102 detects lip movement. For instance, the device 102 identifies a person as a speaker based on his lip movement and directs a microphone beamform toward the speaker to better capture his speech. Where the device 102 determines from captured image data that the speaker is near other individuals and/or other sources of noise, the device 102 narrows the width of the microphone beamform to better isolate and capture speech from the speaker and to reduce the amount of noise captured from other acoustic sources.

For another embodiment, the device 102 associates the first voice data with the first individual by correlating the voice data to the first individual's lip movement. From the image data, the device 102 identifies lip movement that indicates speech. From the acoustic signal, the device 102 identifies the beginning of the voice data and its duration. The device 102 then determines that the first individual began speaking when the voice data was first received and continued speaking until the voice data within the first acoustic signal ended. If the voice data and the lip movement of only one individual are synchronized, then the device 102 associates that individual with the voice data. Using one or more of the aforementioned association methods, the device 102 similarly determines 710 that voice data in the second acoustic signal (or second voice data) originated from the second individual.

For a particular embodiment, the device 102 determines from lip movement identified in captured image data which individual of a group of individuals is speaking. The device 102 further determines, using facial-recognition techniques, for example, the identity of the speaker from the captured image data. Based on the speaker's identify, the device 102 selects a voice-recognition database to use for performing voice recognition while the identified speaker is speaking. The identified speaker, for instance, might have created a speech-recognition database during a previous speech-recognition training session with the device 102.

In addition to using lip movement to determine which subject is speaking, lip movement can also be used to drive a Voice Activity Detector or VAD. Voice activity detection is adjusted as a parameter for voice recognition based on lip movement detected in captured image data. In this case, the lip movement would allow for a better estimate of both the beginning and end of each spoken phrase. Multiple parallel noise reduction processes can be run on the same captured microphone information, the output of which can be compared to the lip-movement-derived VAD decisions to determine which noise reduction process best isolates the speaker of interest from the surrounding noise. This best isolation path can then be passed along to the voice recognition stage.

In a further embodiment, the device 102 determines a distance to an acoustic source from the decibel level of the received voice data. As an acoustic signal is received from greater distances, its sound pressure level drops. Beginning with a sound pressure level for an average conversational voice, the device 102 calculates the distance as a function of attenuation. The device 102 then matches this distance to the distance of the first individual, which, in an embodiment, is determined from the auto-focus setting needed to capture a clear image of the first individual.

At 712, using the speech-to-text capabilities of a voice recognition engine within the voice recognition module 206, the device 102 translates the first voice data into a first written passage within a document. A passage, as used herein, is a portion or section of a written work. Likewise, at 714, the device 102 translates the second voice data into a second written passage within the document. In an embodiment, the device 102 determines from the image data an end of the first voice data for translation into the first written passage and an end of the second voice data for translation into the second written passage. The end of voice data is the point at which dictation stops for a written passage. For example, the device 102 starts a written passage for an individual when his lips begin moving and ends the passage when the individuals lips indicate he has stopped speaking. In a further embodiment, the image data feeds a lip-reading application which serves as a check on the voice translation performed by the voice recognition engine.

For additional embodiments, the translation and annotation of an individual's speech depends on the individual's privileges as defined by the group to which the individual belongs. In one embodiment, the first and second individuals are included within a first group, which has a first set of privileges. The device 102 also receives third voice data from a third individual speaking into the device 102, associates the third voice data to the third individual using the image data, and determines that the third individual is included within a second group, which has a second set of privileges. For a further embodiment, the first set of privileges includes a first level of access to the document, and the second set of privileges includes a second level of access to the document, which prevents translation of the third voice data into a corresponding written passage for inclusion within the document. If the document is a work-related document, for example, the device 102 blocks access for the third individual who is a member of a social group with no work-related access privileges.

Having determined the identity of a speaker for each written passage, the device 102 associates 716, 718 an annotation with one or more of the written passages indicating its origin. To serve as identifiers, the first annotation includes a first name, and the second annotation includes a second name. In further embodiments, the device 102 also appends to the annotations information in addition to the speaker's identity. For example, the first annotation includes a first title, and the second annotation includes a second title, where the title indicates a position held by an employee, or other person within an organization or servicing an organization, associated with the written passage.

Figure 8:
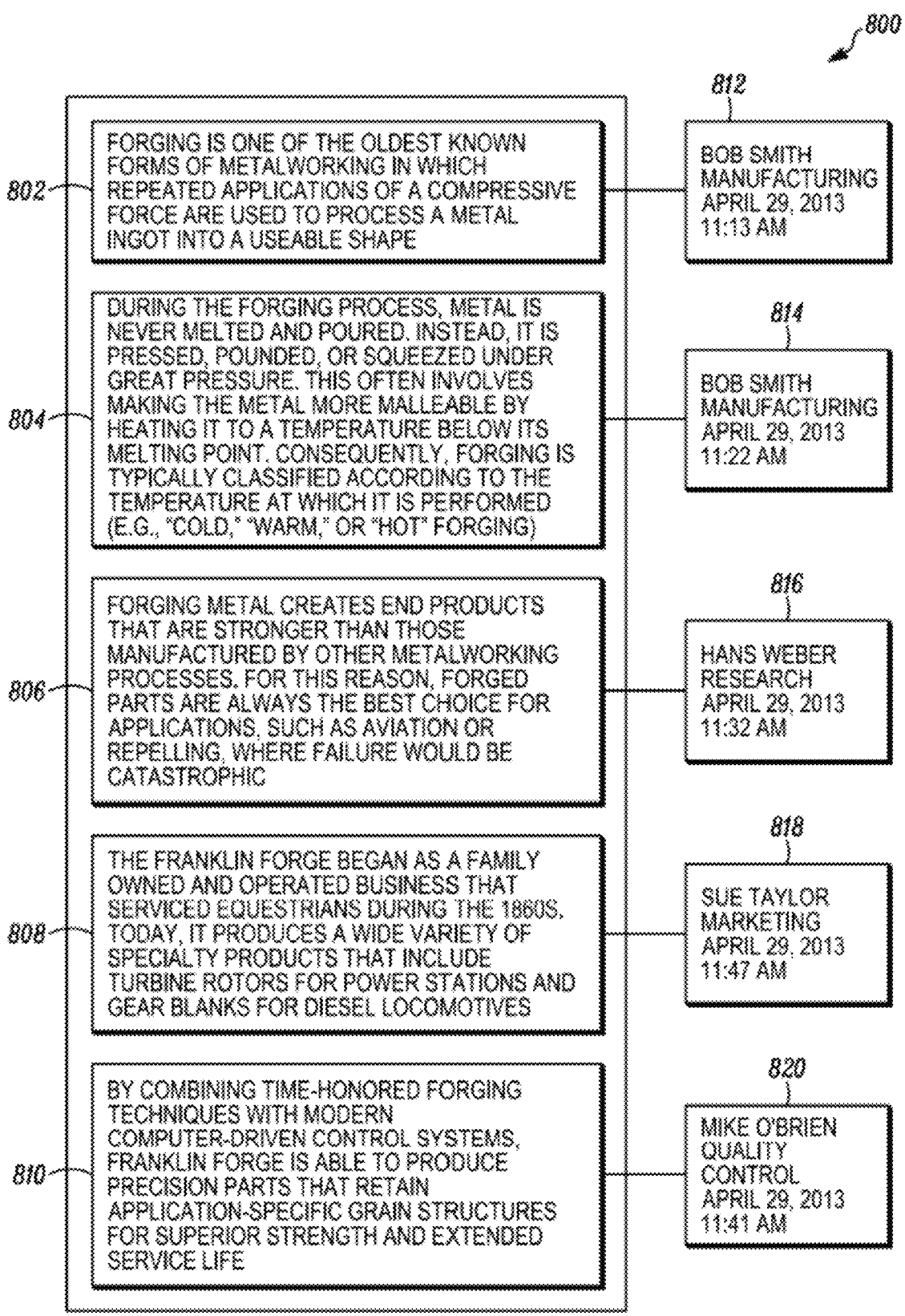
FIG. 8 is an illustration of a document showing annotated dictation in accordance with some embodiments of the present teachings.

FIG. 8 shows a document 800 that illustrates a number of the aforementioned embodiments for annotated dictation. Specifically, the document 800 represents a marketing brochure created by a group of company employees. While the employees are organized around a conference table upon which device 102 is placed, employee Bob Smith dictates the first passage for the brochure 800. From collected image data, the device 102 identifies Bob as an employee with editing privileges for the brochure 800. The device 102 also determines that Bob is speaking, captures Bob's speech, and translates it into text. The device 102 then places the text into the brochure as the written passage identified at 802. The device 102 annotates 812 the passage 802 with Bob's full name, indicates Bob's position in manufacturing, and date stamps the annotation with the time the passage 802 was integrated into the brochure 800.

A second passage dictated by Bob is indicated at 804 and annotated 814 separately. In one embodiment, the separation of Bob's consecutive passages is due to a long pause in the dictation that the device 102 interprets as an indication for a new passage. In another embodiment, a specific verbal command given by Bob instructs the device 102 to begin a new passage.

Ten minutes after Bob's second passage 804 is accepted, Hans Weber, from research, dictates his own contribution the brochure 800. In an embodiment, the device 102 knows to begin processing Hans' dictation because a verbal command is given. Prior to receiving the command, discussions among the group members during the previous ten minutes are ignored by the device 102 as conversational noise. For a particular embodiment, Hans precedes his dictation with the command "start passage" and follows it with the command "end passage." After receiving the "end passage" command, the device 102 adds passage 806 to the brochure 800 with the annotation 816 that indicates Hans' full name, job title, and the time the passage was added.

As indicated by the annotations 818 and 820, written passages dictated by Sue Taylor and Mike O'Brien appear at 808 and 810, respectively. The passages, however, are not organized chronologically. For a particular embodiment, verbal organizational commands are accepted by the device 102. By speaking one such command, Sue indicates that passage 808 is to be placed between passages 806 and 810. In this embodiment each annotation begins with a verbal command. For an alternative embodiment, an initial command is given to begin annotation, and all comments by all recognized users are transcribed without each having to issue separate verbal commands. A single verbal command begins the automated transcription which continues until another verbal command ends the process. This alternative embodiment results in a complete transcript of a conversation such as for an automated transcription of a meeting.

In an alternate embodiment for annotated dictation, the device 102 accepts dictation for speech-to-text conversion while an authorized user is gazing at the device 102. Voice data received from anyone not gazing at the device 102 is ignored. This provides a means by which the device 102 can distinguish between intended dictation and conversational noise. For other embodiments, the use of gaze detection to aid voice recognition extends beyond annotated dictation.

Figure 9:
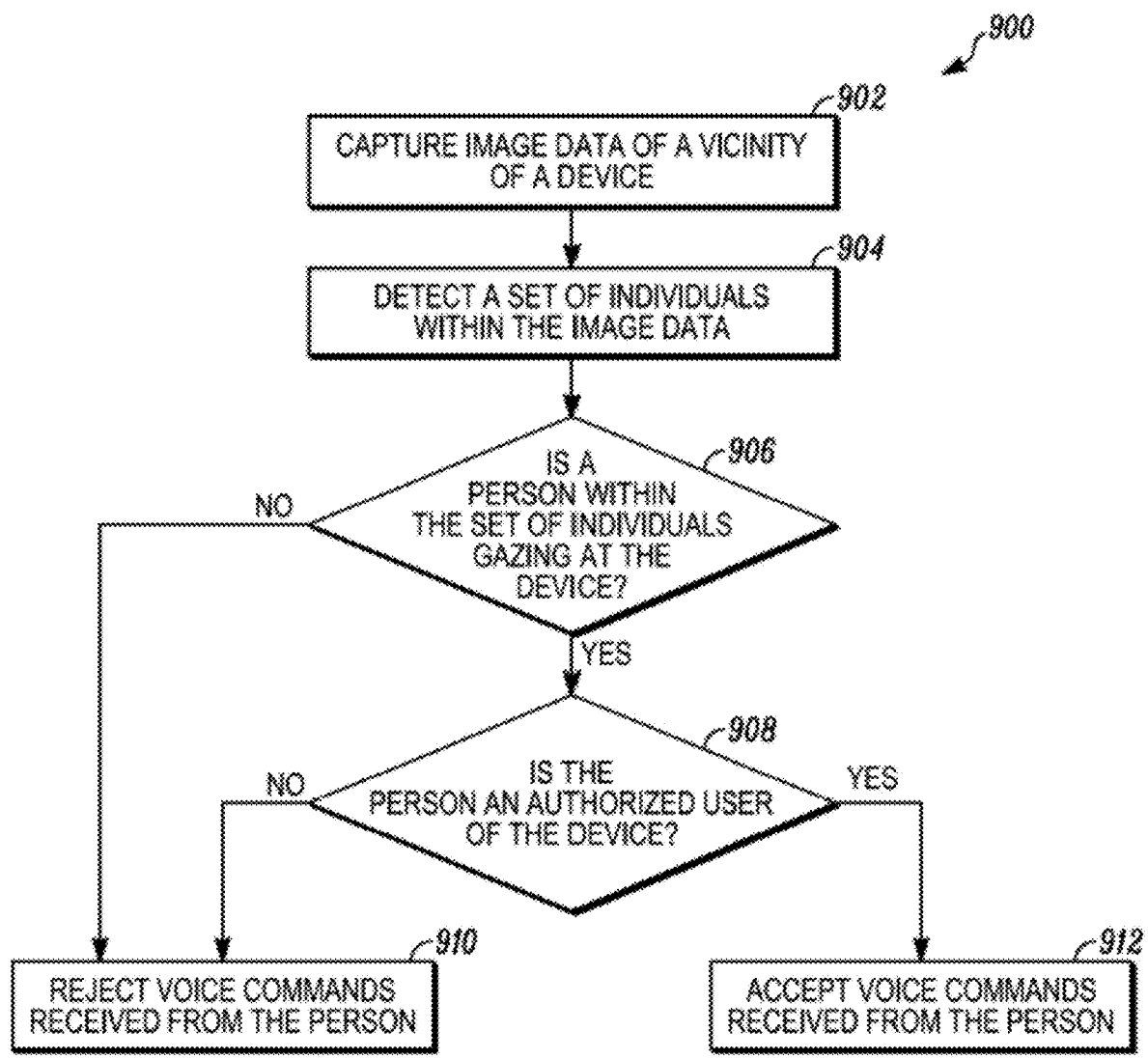
FIG. 9 is a flowchart of a method using gaze detection for voice recognition in accordance with some embodiments of the present teachings.

FIG. 9 shows a method 900 for voice recognition, consistent with embodiments of the present teachings, that incorporates gaze detection. More specifically, the method 900 shows a device, such as device 102, capturing 902 image data of a vicinity of the device 102. From the image data, the device 102 detects a set of individuals that are, for example, located within audio range of its acoustic transducers 110, 112. At 906, the device 102 determines if a person within the set of individuals is gazing at the device 102.

For some embodiments, the device 102 determines that a person is gazing at the device 102 if certain features of the persons face are visible to the device 102. In one embodiment, the device 102 adjusts the focal length of its camera 106 to frame the persons face while switching to a high definition (HD) mode to provide greater resolution to distinguish facial detail. If the device 102 can discern both eyes, a nose, and a mouth for the framed face, that person is determined to be gazing at the device 102. If, thereafter, the person turns his head to the left such that his left eye is no longer visible to the camera 106, the device 102 determines that the person is no longer gazing in its direction.

In other embodiments, when the person is close enough to see the eyes clearly, the device 102 determines whether or not the person is gazing at it by tracking the person's pupils. For one embodiment, the device 102 uses an infrared (IR) camera to determine whether or not the person is gazing at the device 102 in low light conditions.

If the device 102 determines that a person is not gazing at it, the device 102 rejects 910 voice commands received from that person. In an embodiment, the device 102 receives voice data from a person that falsely triggers command recognition (e.g., when the trigger threshold for phoneme recognition is set low). Because the person is not gazing at the device 102, the device 102 ignores the perceived verbal command. In this way, gaze detection serves as an additional check on voice recognition.

When the device 102 determines that a person is gazing at it, in one embodiment the device 102 uses the image data it has showing that person's full facial details to match that person to one of the profiles stored in its three accessible databases 602-606. In this way, the device 102 determines 908 whether the person gazing at it is an authorized user. If the person is determined not to be an authorized user, the device 102 rejects 910 verbal commands received from that person. If the person is determined to be an authorized user, the device 102 accepts 912 verbal commands received from that person.

In a particular embodiment, the processor 214 of the device 102 is configured to determine if at least one individual gazing at the device 102 includes an authorized user of the device 102, wherein the processor 214 is further configured for adapting processing by the voice recognition module 206 by activating the voice recognition module 206 to process voice data received into at least one of its acoustic transducers 110, 112 only if the at least one user is determined to include an authorized user. As used herein, activating the voice recognition module 206 to process voice data indicates that the voice recognition module 206 processes the voice data and applies the processed voice data for the purpose of the voice recognition. For a first example, when the purpose of the voice recognition is accepting verbal commands, activating the voice recognition module 206 to process voice data indicates the voice recognition module 206 processes voice data to recognize a verbal command and applies (i.e., executes) the verbal command, rather than rejecting or ignoring it. For a second example, when the purpose of the voice recognition is to convert speech to a written text passage, activating the voice recognition module 206 to process voice data indicates the voice recognition module 206 processes voice data to recognize spoken words and applies those words to the written text passage, rather than rejecting or ignoring them.

For other embodiments, the device 102 uses gaze detection in setting its trigger threshold. Given that the device 102 has detected a set of individuals in its vicinity from captured image data, the device 102, in a first embodiment, identifies at least one authorized person within the set of individuals to trigger voice recognition. The device 102 sets the trigger threshold to make the trigger less discriminating when all persons of the set of individuals are identified as authorized persons relative to when fewer than all of the persons of the set of individuals are identified as authorized persons. This mitigates the chance that speech from unauthorized individuals will trigger command recognition.

In a second embodiment, the device 102 detects that a person within the set of individuals is gazing at the device 102 and sets the trigger threshold to make the trigger less discriminating when the person is gazing at the device 102 relative to when no one within the set of individuals is detected gazing at the device 102. This assumes that a perceived voice command is more likely to be an intended voice command if a speaker is gazing at the device 102.

In a further embodiment, the device 102 determines whether the person gazing at the device 102 is an authorized person to trigger voice recognition, wherein the device 102 makes the trigger less discriminating only when the person gazing at the device 102 is an authorized person. That the speaker is both gazing at the device 102 and an authorized user of the device 102 makes it even more likely that the perceived voice command is valid and intentional.

Figure 10:
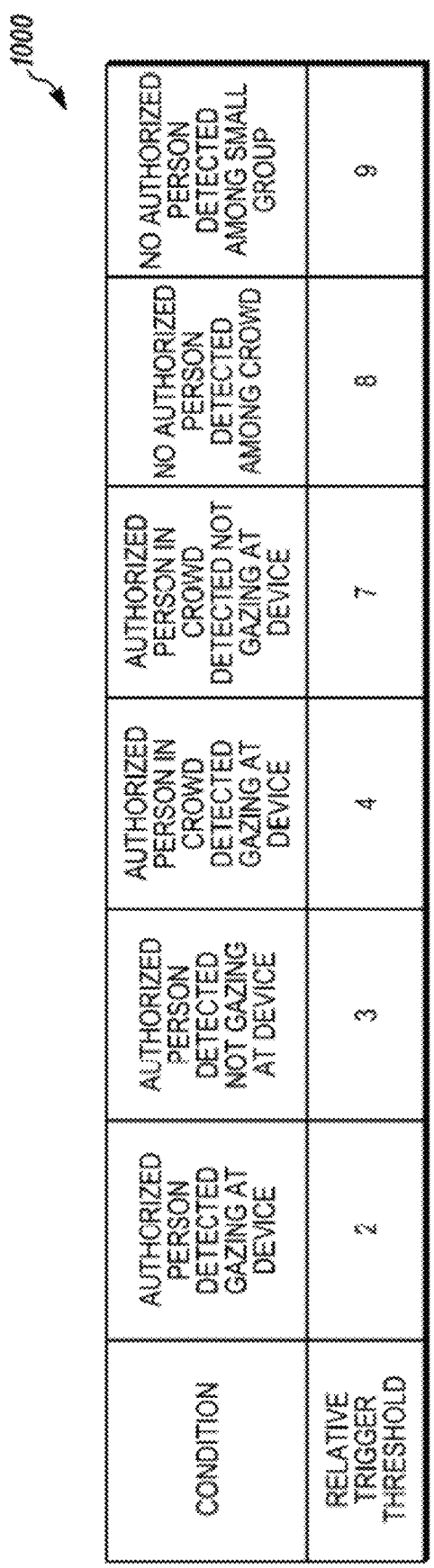
FIG. 10 is a table of relative trigger thresholds for voice recognition in accordance with some embodiments of the present teachings.

FIG. 10 shows a table 1000 that indicates additional settings for the trigger threshold that depend on gaze detection. Specifically, table 1000 shows six conditions on which the trigger threshold depends and a corresponding relative trigger threshold for each. The conditions, which are consistent with embodiments of the present teachings, are arranged in order of increasing sensitivity, with the most discriminating trigger represented by the right-hand side of the table 1000.

As indicated by the first condition in the table 1000, when the device 102 detects an authorized person gazing at it, it sets the trigger threshold to "2." For an embodiment, the device 102 sets the trigger threshold to "1" (not shown) when it determines that the authorized person gazing at the device 102 is the only person in the vicinity of the device 102. The device 102 sets the trigger threshold slightly higher when it determines the authorized person is not gazing at the device 102.

The third and fourth conditions involve the device 102 detecting an authorized person in a crowd. When the authorized person is determined to be gazing at the device 102, the device 102 sets the trigger threshold to "4." Otherwise, if the authorized person is determined not to be gazing at the device 102, the device 102 sets the trigger threshold to a relatively higher value of "7."

The fifth and sixth conditions apply when the device 102 fails to detect any authorized person in its vicinity. For a first embodiment the device 102 rejects all voice commands when no authorized people are detected. In a second embodiment, shown in table 1000, the device 102 sets a high trigger threshold to reduce the chance of a false positive. For the second embodiment, the device 102 assumes there might be an authorized individual nearby who is hidden from view or has otherwise failed to be detected. As shown, the trigger threshold is lower for a crowd as compared to a small group. This is because an authorized individual is more likely to be hidden in a crowd as well as it is more likely that noise generated by the crowd would be louder than that of a small group. In the higher noise, the threshold is reduced so as not to miss valid voice triggers and commands. In an alternate embodiment, the device 102 sets the trigger threshold higher for the crowd because there are more voices that could potentially trigger a false positive for voice recognition.

In other embodiments, the processor 214 of the device 102 is configured to determine that at least one person within a set of individuals detected in the vicinity of the device 102 is gazing at it, and the processor is further configured to adapt processing by its voice recognition module 206 to favor voice data received from the at least one person gazing at the device 102 relative to voice data received from other persons. To favor voice data, as used herein, means to single out the voice data over other voice data for voice recognition. For a particular embodiment, favoring voice data received from the at least one person gazing at the device 102 includes the processor 214 of the device 102 being configured for determining a direction to the at least one person and using beam forming to favor voice data received from that direction over voice data received from other directions, or determining a distance to the at least one person and using gradient discrimination to favor voice data received from that distance over voice data received from other distances. Alternatively, the device 102 can switch to a new voice recognition algorithm or database to better identify speech from the detected user. In this case, the new algorithm or database could be user specific, gender specific, or dialect specific.

Figure 11:
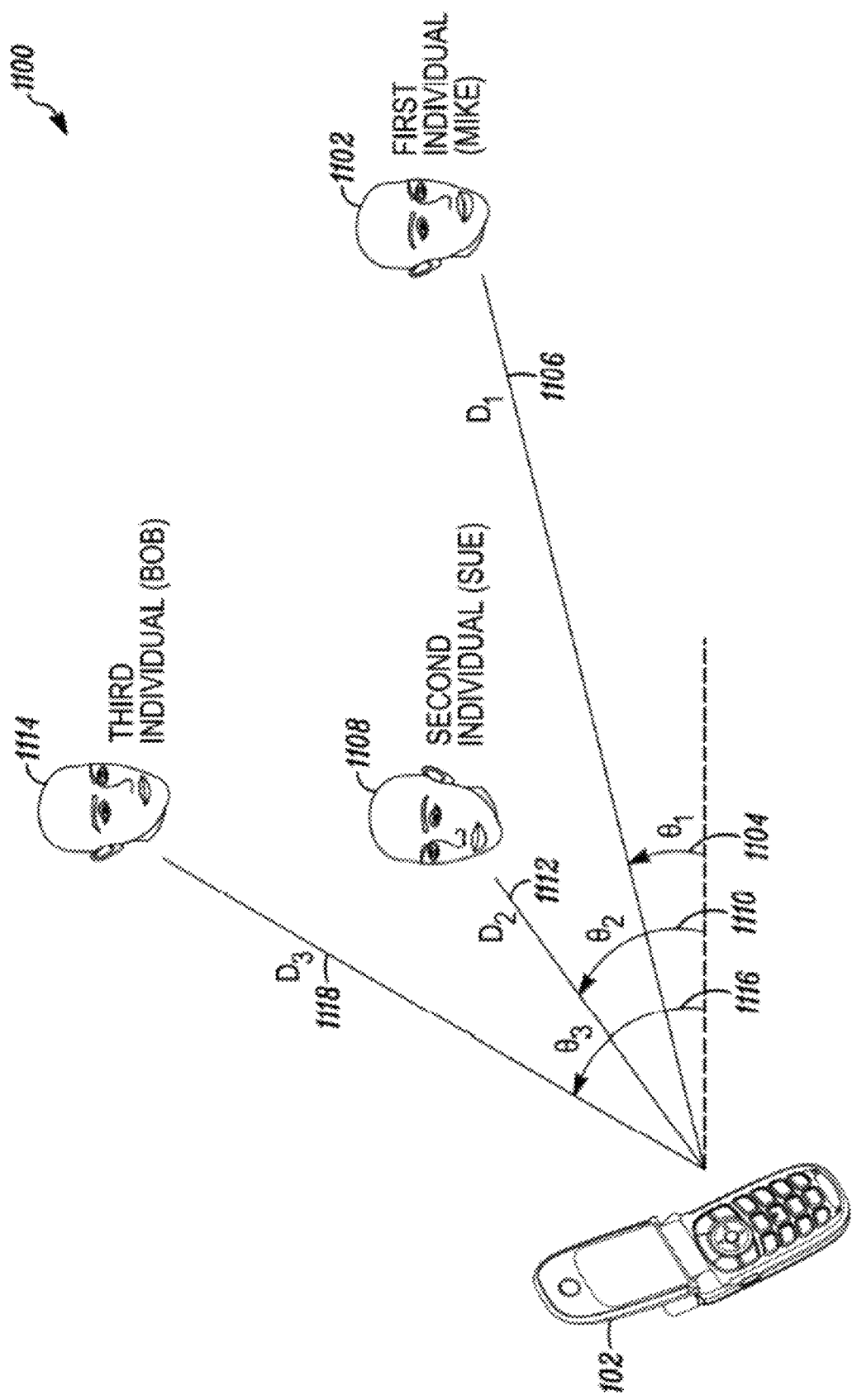
FIG. 11 is a schematic diagram illustrating gaze detection in accordance with some embodiments of the present teachings.

FIG. 11 is a schematic diagram 1100 illustrating an embodiment for which the device 102 favors voice data being received from a person gazing at the device 102. More specifically, the diagram 1100 shows device 102 and three individuals it detects in its vicinity, namely Mike at 1102, Sue at 1108, and Bob at 1114. Mike's position relative to the device 102 is indicated by a distance $d_1$ 1106 with an angle measure of $\theta_1$ 1104. Similarly, the positions of Sue and Bob relative to the device 102 are indicated by distance $d_2$ 1112 with an angle measure of $\theta_2$ 1110, and a distance $d_3$ 1118 with an angle measure of $\theta_3$ 1116, respectively. Of the three individuals, only Sue is shown gazing at the device 102.

For particular embodiments, the device 102 determines a person's relative position using one of its cameras (e.g., camera 108). The device 102 uses the processing element 214 to calculate a distance to a person from the autofocus setting of the camera 108 that brings the person into focus. To determine an angle measure to a person, the device 102 analyzes a captured image that includes the person. By determining how far "off center" the person is in the image, the device 102 calculates the angle measure to the person, which is also a function of the focal length of the camera 108.

Because Sue is gazing at the device 102, the device 102 favors voice data received from her over voice data received from Mike and Bob. In one instance, the device 102 uses beam forming technology to apply a gain to acoustic signals received from Sue's direction (i.e., $\theta_2$ 1110) over signals originating from other directions (e.g., $\theta_1$ 1104 and $\theta_3$ 1116). For one embodiment, the device 102 uses multiple acoustic transducers as a phased array such that signals originating from Sue's direction experience constructive interference. The correct timing that produces constructive interference can be achieved from physical path differences resulting from the spatial arrangement of the acoustic transducers and/or by introducing a delay to one or more of the interfering signals electronically. Other techniques of using beam forming to apply a position-dependent gain to a signal are known in the art.

In another instance, the device 102 favors voice data received from Sue by applying gain to acoustic signals received from Sue's distance (i.e., $d_2$ 1112) over signals originating from other directions (e.g., $d_1$ 1106 and $d_3$ 1118). In one embodiment, the device 102 uses an acoustic gradient technique to isolate Sue's voice from the voices of Mike and Bob on the basis that Sue's voice is received at the microphones 110, 112 with the greatest amplitude because she is the closest. In an alternate embodiment, where Sue is the farthest person from the device 102, the device 102 electronically separates the received voice signals and applies a gain to the weakest one (i.e., Sue's voice signal). In another embodiment, the device 102 ignores near-field and far-field voices where Sue's radial position is between Mike and Bob, and possibly others.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What we claim is:

1. A computer-implemented method executed on data processing hardware of a computing device that causes the data processing hardware to perform operations comprising:
  receiving a first acoustic signal comprising first voice data corresponding to an utterance spoken by a user of the computing device;
  determining, by processing the first voice data, that the utterance spoken by the user comprises a specific verbal command directed toward the computing device that instructs the computing device to process subsequent speech spoken by the user; and
  in response to determining that the utterance spoken by the user comprises the specific verbal command:
    receiving image data of a vicinity of the computing device, the image data captured by a camera of the computing device;
    determining a direction of the user relative to the computing device based on the image data captured by the camera;
    adjusting, based on the direction of the user relative to the computing device, a microphone beamform; and
    receiving, using the microphone beamform, a second acoustic signal comprising second voice data corresponding to the subsequent speech spoken by the user.

2. The computer-implemented method of claim 1, wherein adjusting the microphone beamform comprises adjusting the microphone beamform to better isolate and capture the second voice data in the second acoustic signal.

3. The computer-implemented method of claim 1, wherein adjusting the microphone beamform comprises adjusting the microphone beamform to reduce an amount of noise captured in the second acoustic signal from acoustic sources other than the user.

4. The computer-implemented method of claim 1, wherein the operations further comprise:
  determining that the user is gazing toward the computing device based on the image data captured by the camera,
  wherein adjusting the microphone beamform is further based on the determining that the user is gazing toward the computing device.

5. The computer-implemented method of claim 1, wherein the operations further comprise:
  determining that the image data captured by the camera includes a representation of a person,
  wherein determining the direction of the user is based on the image data and the determination that the image data captured by the camera includes the representation of the person.

6. The computer-implemented method of claim 5, wherein determining that the image data captured by the camera includes the representation of the person comprises determining that the image data includes a representation of both eyes, a nose, and a mouth of a person.

7. The computer-implemented method of claim 5, wherein determining that the image data captured by the camera includes the representation of the person comprises determining that the image data includes a representation of an authorized user of the computing device.

8. The computer-implemented method of claim 1, wherein the operations further comprise, after adjusting the microphone beamform, performing speech recognition on the second voice data corresponding to the subsequent speech spoken by the user.

9. The computer-implemented method of claim 1, wherein receiving the image data of the vicinity of the computing device comprises receiving the image data of the vicinity of the computing device while receiving the first acoustic signal comprising the first voice data corresponding to the utterance spoken by the user.

10. The computer-implemented method of claim 1, wherein the first acoustic signal further comprises noises captured from acoustic sources other than the user.

11. A computing device associated with a user, the computing device comprising:
  a plurality of microphones;
  a camera;
  data processing hardware; and
  memory hardware in communication with the data processing hardware and storing instructions that when executed on the data processing hardware cause the data processing hardware to perform operations comprising:

receiving a first acoustic signal comprising first voice data corresponding to an utterance spoken by a user of the computing device;

determining, by processing the first voice data, that the utterance spoken by the user comprises a specific verbal command directed toward the computing device that instructs the computing device to process subsequent speech spoken by the user; and in response to determining that the utterance spoken by the user comprises the specific verbal command:

receiving image data of a vicinity of the computing device, the image data captured by a camera of the computing device;

determining a direction of the user relative to the computing device based on the image data captured by the camera;

adjusting, based on the direction of the user relative to the computing device, a microphone beamform; and receiving, using the microphone beamform, a second acoustic signal comprising second voice data corresponding to the subsequent speech spoken by the user.

12. The computing device of claim 11, wherein adjusting the microphone beamform comprises adjusting the microphone beamform to better isolate and capture the second voice data in the second acoustic signal.

13. The computing device of claim 11, wherein adjusting the microphone beamform comprises adjusting the microphone beamform to reduce an amount of noise captured in the second acoustic signal from acoustic sources other than the user.

14. The computing device of claim 11, wherein the operations further comprise:

determining that the user is gazing toward the computing device based on the image data captured by the camera, wherein adjusting the microphone beamform is further based on the determining that the user is gazing toward the computing device.

15. The computing device of claim 11, wherein the operations further comprise:

determining that the image data captured by the camera includes a representation of a person, wherein determining the direction of the user is based on the image data and the determination that the image data captured by the camera includes the representation of the person.

16. The computing device of claim 15, wherein determining that the image data captured by the camera includes the representation of the person comprises determining that the image data includes a representation of both eyes, a nose, and a mouth of a person.

17. The computing device of claim 15, wherein determining that the image data captured by the camera includes the representation of the person comprises determining that the image data includes a representation of an authorized user of the computing device.

18. The computing device of claim 11, wherein the operations further comprise, after adjusting the microphone beamform, performing speech recognition on the second voice data corresponding to the subsequent speech spoken by the user.

19. The computing device of claim 11, wherein receiving the image data of the vicinity of the computing device comprises receiving the image data of the vicinity of the computing device while receiving the first acoustic signal comprising the first voice data corresponding to the utterance spoken by the user.

20. The computing device of claim 11, wherein the first acoustic signal further comprises noises captured from acoustic sources other than the user.

* * * * *